(12) United States Patent
Silveri et al.

(10) Patent No.: US 7,998,024 B2
(45) Date of Patent: Aug. 16, 2011

(54) SYSTEM FOR USING MECHANICAL POWER TO OPERATE A HYBRID ELECTRIC VEHICLE

(75) Inventors: Andrew John Silveri, Royal Oak, MI (US); Daniel Scott Colvin, Farmington Hills, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/905,143

(22) Filed: Oct. 15, 2010

(65) Prior Publication Data

US 2011/0031049 A1 Feb. 10, 2011

Related U.S. Application Data

(62) Division of application No. 11/938,412, filed on Nov. 12, 2007, now Pat. No. 7,837,593.

(51) Int. Cl.
*B60W 10/02* (2006.01)
(52) U.S. Cl. ...................................... 477/6; 477/5; 477/8
(58) Field of Classification Search ............... 477/3, 5, 477/6, 8
See application file for complete search history.

(56) References Cited

U.S. PATENT DOCUMENTS

| | | | |
|---|---|---|---|
| 6,556,910 | B2 | 4/2003 | Suzuki et al. |
| 6,776,739 | B2 | 8/2004 | Eguchi et al. |
| 7,013,213 | B2 | 3/2006 | McGee et al. |
| 7,079,942 | B2 | 7/2006 | McGee et al. |
| 7,089,095 | B2 | 8/2006 | Takami et al. |
| 7,416,511 | B2 | 8/2008 | Nishina et al. |
| 7,465,251 | B2 | 12/2008 | Zhang |
| 7,566,288 | B2 | 7/2009 | Tabata et al. |
| 7,713,164 | B2 | 5/2010 | Silveri et al. |
| 7,743,860 | B2 | 6/2010 | Soliman et al. |
| 2002/0179351 | A1 | 12/2002 | Shimabukuro et al. |
| 2006/0137921 | A1 | 6/2006 | Colvin et al. |
| 2006/0169503 | A1 | 8/2006 | Oliver et al. |
| 2006/0169504 | A1 | 8/2006 | Oliver et al. |
| 2007/0056783 | A1 | 3/2007 | Joe et al. |
| 2009/0042689 | A1* | 2/2009 | Soliman et al. ................ 477/5 |
| 2009/0140521 | A1* | 6/2009 | Bryan et al. ................ 290/31 |
| 2010/0228412 | A1* | 9/2010 | Sah ................ 701/22 |

FOREIGN PATENT DOCUMENTS

| | | |
|---|---|---|
| GB | 2416600 A | 2/2006 |
| WO | 0015455 | 3/2000 |

* cited by examiner

*Primary Examiner* — Ha D. Ho
(74) *Attorney, Agent, or Firm* — David B. Kelley; Brooks Kushman P.C.

(57) ABSTRACT

An automotive transmission transitions from a drive gear to a neutral gear when an engine is shutdown. During a rolling pull-up, a crankshaft of the engine will be spun up to a desired speed and the transmission will transition from the neutral gear to an appropriate gear based on a shift schedule. A target transmission input speed is commanded to be a synchronous speed plus an offset to smoothly transition out of electric axle drive propulsion.

9 Claims, 5 Drawing Sheets

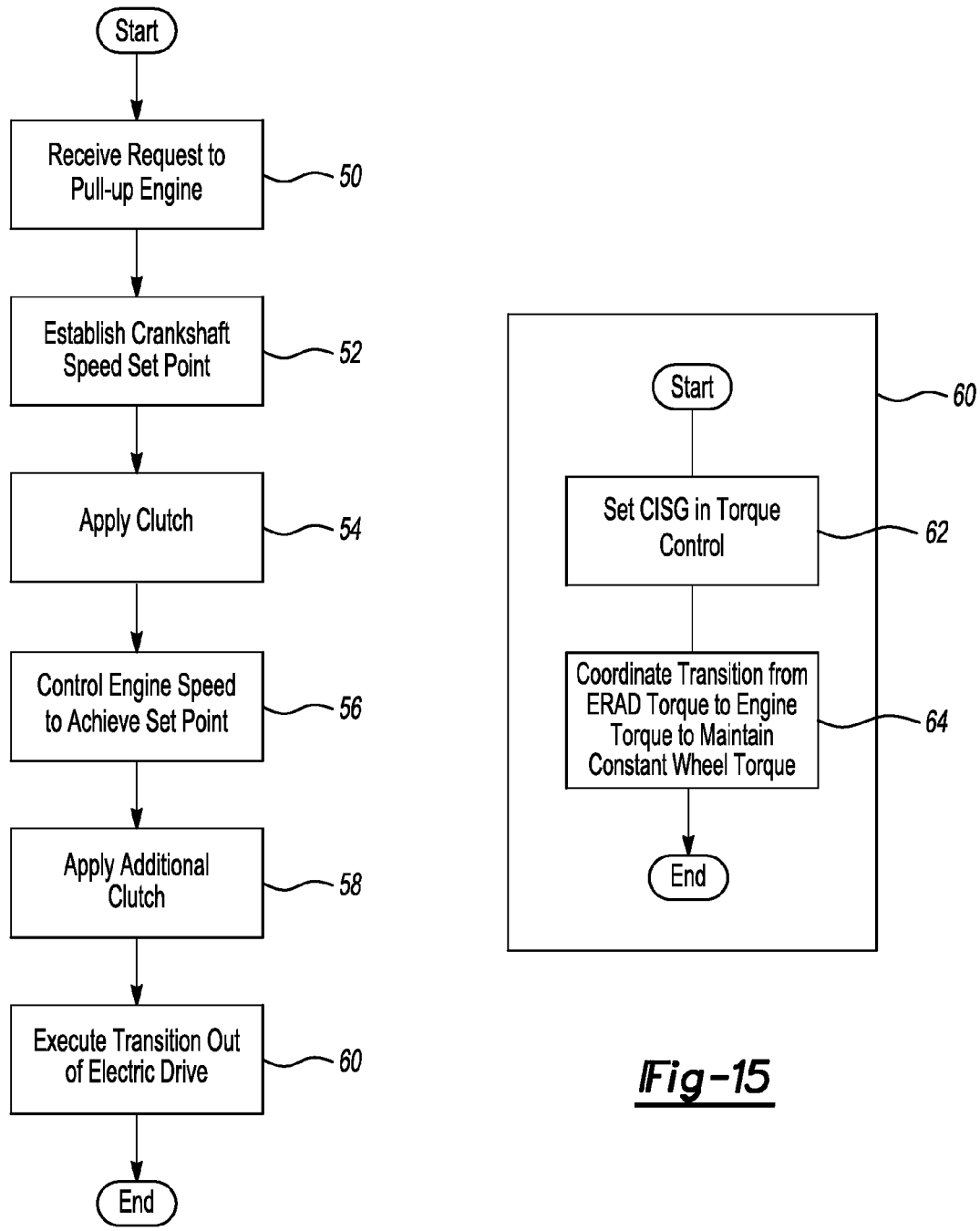

SYSTEM FOR USING MECHANICAL POWER TO OPERATE A HYBRID ELECTRIC VEHICLE

CROSS-REFERENCE TO RELATED APPLICATION

This application is a divisional of application Ser. No. 11/938,412, filed Nov. 12, 2007.

BACKGROUND

1. Field of the Invention

The invention relates to systems for using mechanical power to operate a hybrid electric vehicle.

2. Background Art

A hybrid electric vehicle (HEV) uses power generated by an internal combustion engine and an electric motor to move the vehicle. A HEV may provide improved fuel economy compared to conventional vehicles. One technique for improving the fuel economy in a HEV is to shutdown the engine when it is not needed to move the vehicle. In this situation, the electric motor provides power to move the vehicle. The engine then is started as needed. Starting the engine when the vehicle is moving under the power of the electric motor may cause a noticeable torque disturbance in a driveline of the vehicle.

Various methods are used to control an engine start in a vehicle. U.S. Pat. No. 7,013,213 to McGee et al. is an example of such a method. According to McGee et al., a smoothness factor is calculated to determine how smooth an engine start should be. Engine operating variables regulate engine smoothness during engine start events as determined by the calculated smoothness factor appropriate for selected vehicle operating conditions.

U.S. Pub. No. 2006/0137921 to Colvin et al. is another example of such a method. According to Colvin et al., a vehicle has a motor/generator, a disconnect clutch disposed between an engine and the motor/generator, and a transmission disposed between the motor/generator and vehicle drive wheels. The transmission includes an input clutch, which is selectively engagable for providing torque transfer between the motor/generator and the vehicle drive wheels. When an engine start is requested, the motor/generator is operated, and a start mode for the engine is determined based on a number of vehicle parameters. A transmission input clutch is partially disengaged to at least partially isolate the vehicle drive wheels from engine torque disturbances when the engine is started. The disconnect clutch then is engaged, and the engine is fueled to effect torque production by the engine.

SUMMARY

Mechanical power may be used to operate a hybrid electric vehicle. A target crankshaft speed is established. An electric machine is operated to spin a crankshaft of an engine at the target crankshaft speed. A mechanical path between the crankshaft and a wheel is selectively established via a transmission to pass mechanical power between the crankshaft and the wheel. The mechanical power is then used to operate the vehicle.

BRIEF DESCRIPTION OF THE DRAWINGS

FIG. 14 is a flow chart of a strategy for executing a rolling pull-up of an engine in a hybrid electric vehicle in accordance with certain embodiments of the invention.

FIG. 15 is a flow chart of a strategy for executing a transition out of electric drive in accordance with certain embodiments of the invention.

DETAILED DESCRIPTION

Strategies to control electric motors and transmissions of hybrid electric vehicles (HEVs) while shifting in and out of neutral are disclosed. In one example, an engine is shut down during conditions in which the engine operates inefficiently. An electric axle drive is connected to an axle, front and/or rear, and may provide torque directly to wheels. When the engine is shut down, a transmission will transition from a drive gear to a neutral gear so that spin and pump losses are not carried while driving electrically. A crankshaft of the engine will be spun up to a desired speed and the transmission will transition from the neutral gear to an appropriate gear based on a shift schedule. A target transmission input speed is commanded to be a synchronous speed plus an offset. The offset may be positive or negative. This is done to ensure a smooth transition out of electric axle drive propulsion.

Figure 1:
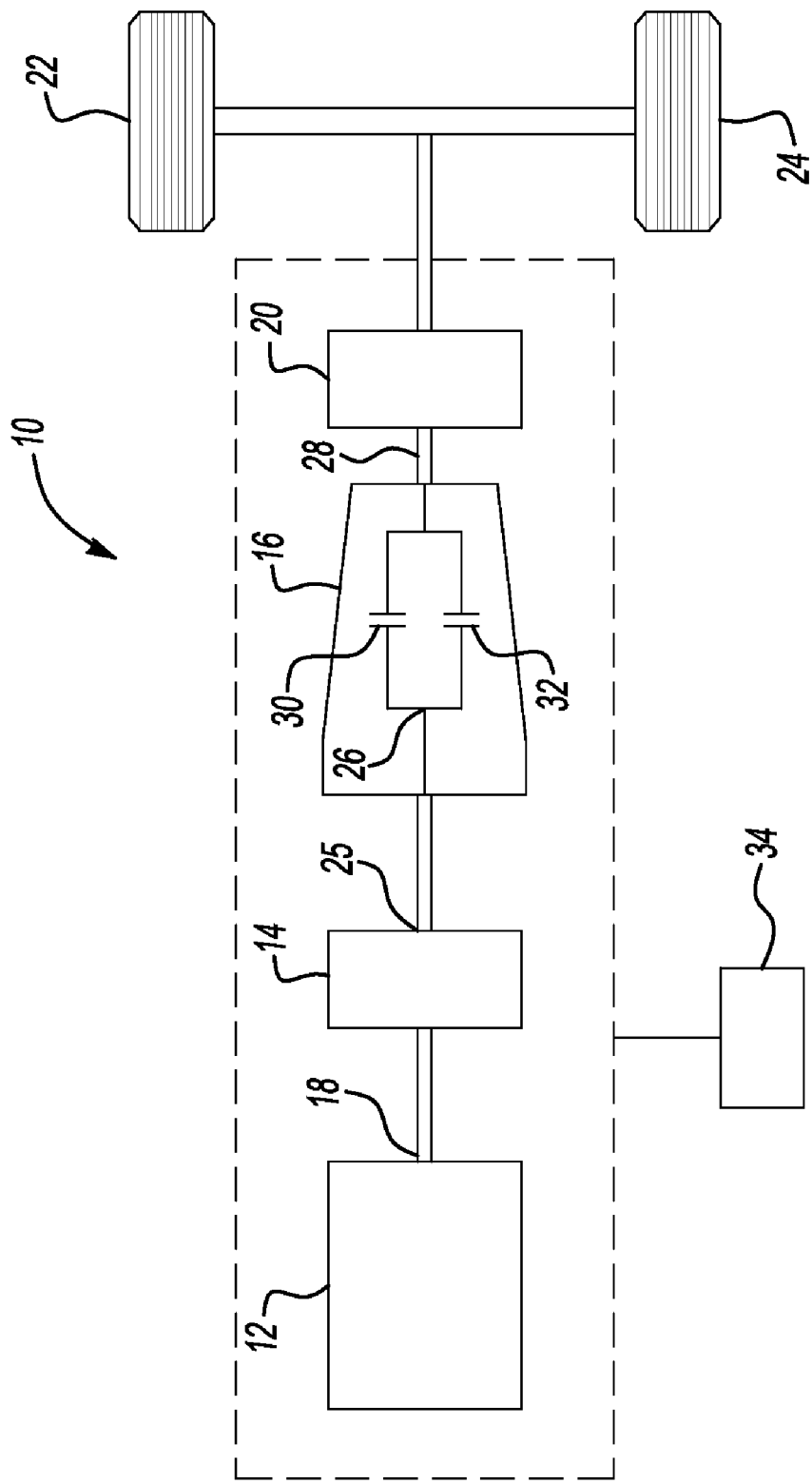
FIG. 1 is schematic view of an exemplary rear wheel drive hybrid electric vehicle in accordance with certain embodiments of the invention.
Figure 2:
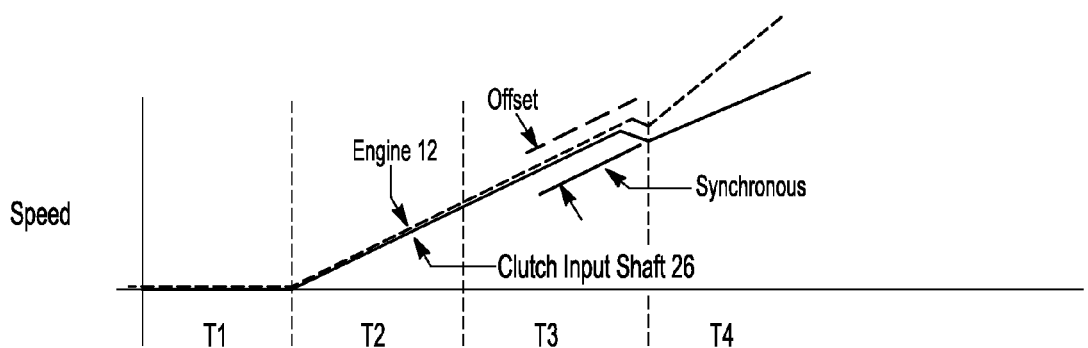
FIG. 2 is an exemplary plot of engine and clutch input shaft speed versus time for the vehicle of FIG. 1.
Figure 3:
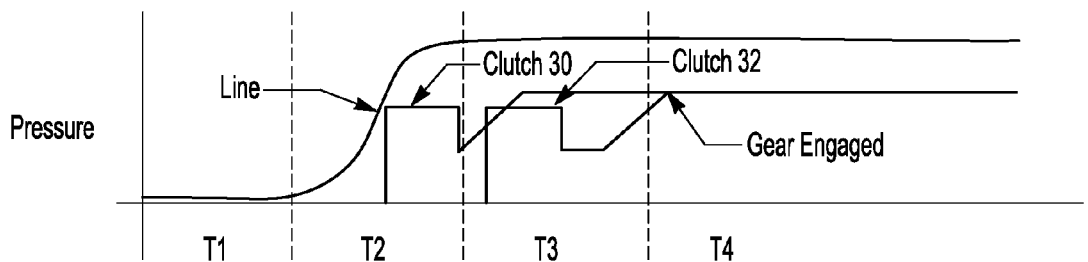
FIG. 3 is an exemplary plot of line and clutch pressure versus time for the vehicle of FIG. 1.
Figure 4:
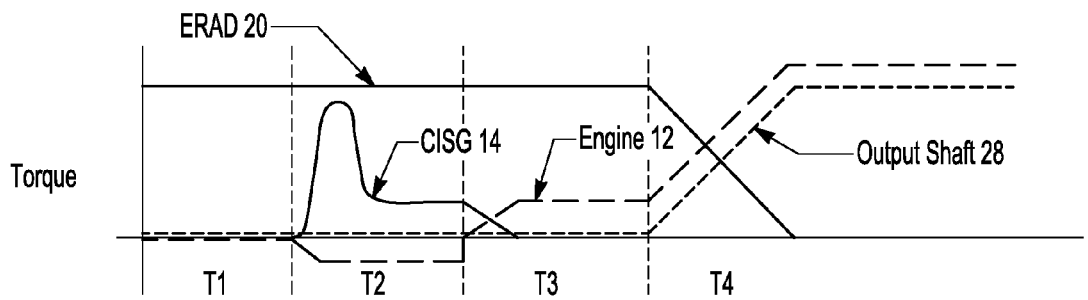
FIG. 4 is an exemplary plot of electric rear axle drive, crank integrated starter/generator, engine and output shaft torque versus time for the vehicle of FIG. 1.
Figure 5:
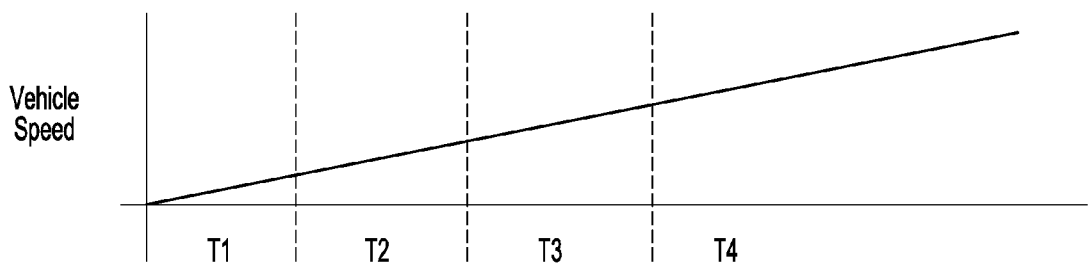
FIG. 5 is an exemplary plot of vehicle speed versus time for the vehicle of FIG. 1.
Figure 6:
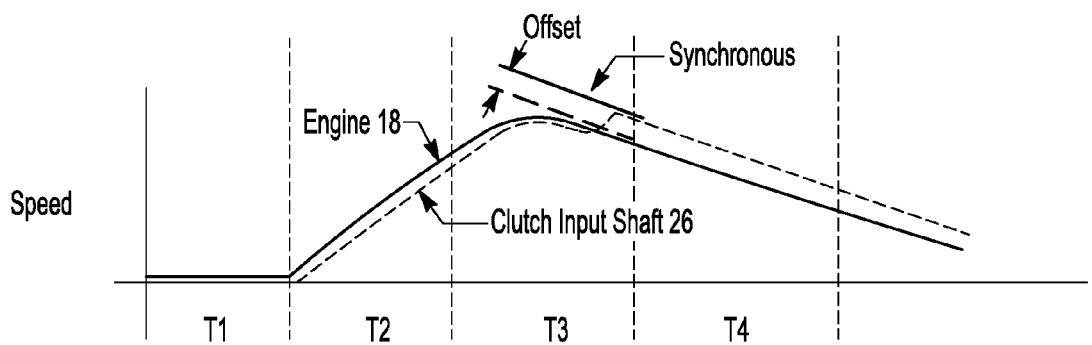
FIG. 6 is another exemplary plot of engine and clutch input shaft speed versus time for the vehicle of FIG. 1.
Figure 7:
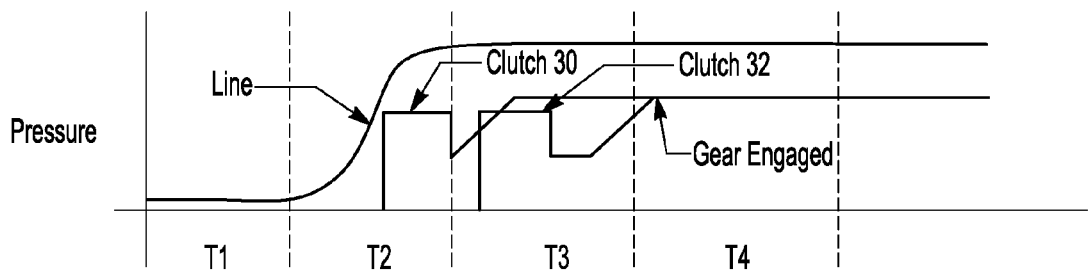
FIG. 7 is another exemplary plot of line and clutch pressure versus time for the vehicle of FIG. 1.
Figure 8:
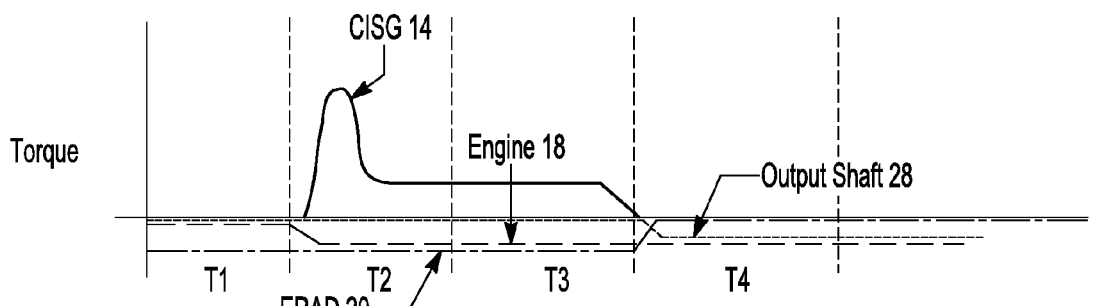
FIG. 8 is another exemplary plot of electric rear axle drive, crank integrated starter/generator, engine and output shaft torque versus time for the vehicle of FIG. 1.
Figure 9:
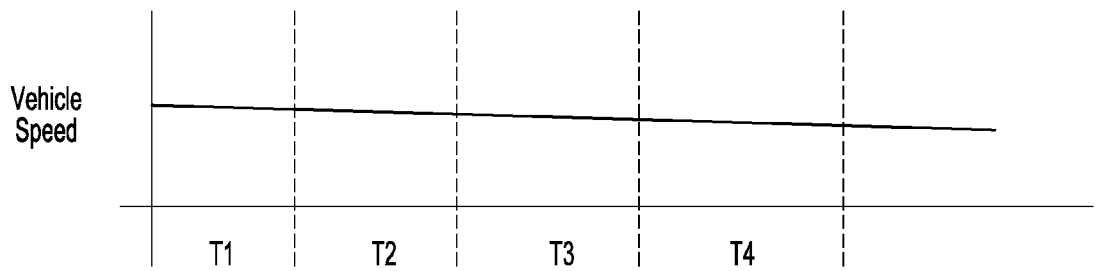
FIG. 9 is another exemplary plot of vehicle speed versus time for the vehicle of FIG. 1.
Figure 10:
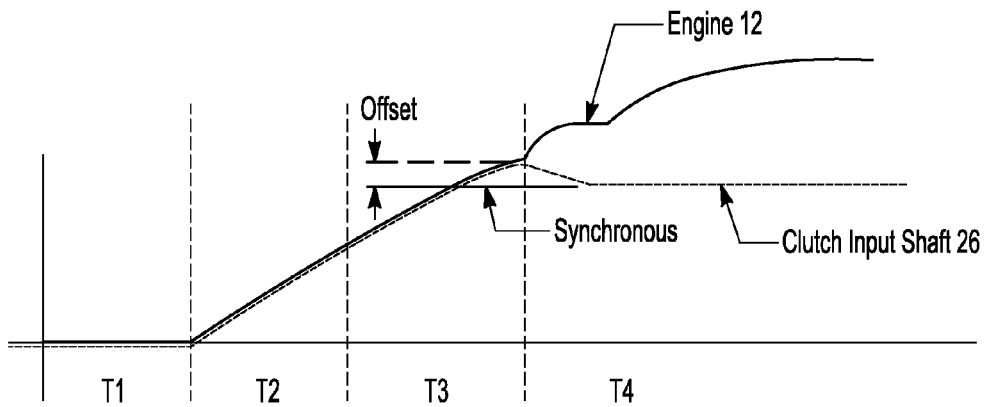
FIG. 10 is yet another exemplary plot of engine and clutch input shaft speed versus time for the vehicle of FIG. 1.
Figure 11:
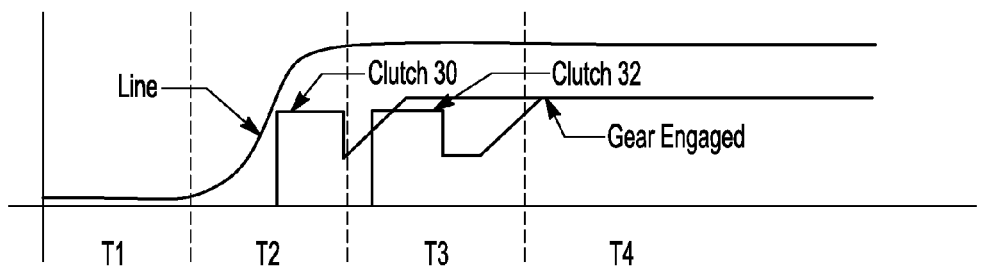
FIG. 11 is yet another exemplary plot of line and clutch pressure versus time for the vehicle of FIG. 1.
Figure 12:
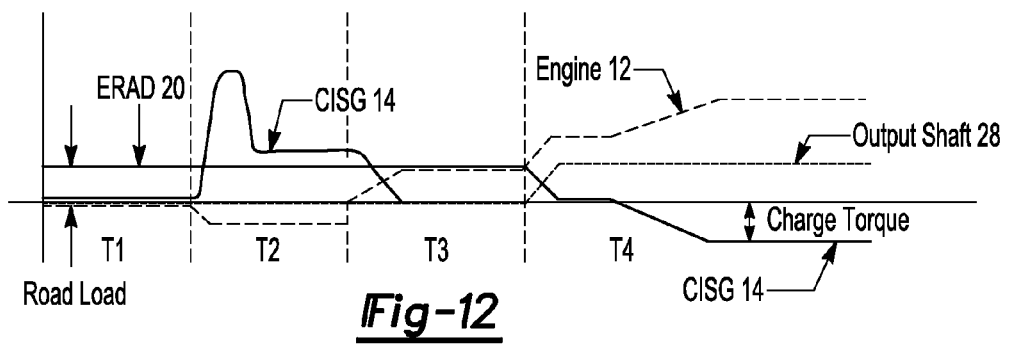
FIG. 12 is yet another exemplary plot of electric rear axle drive, crank integrated starter/generator, engine and output shaft torque versus time for the vehicle of FIG. 1.
Figure 13:
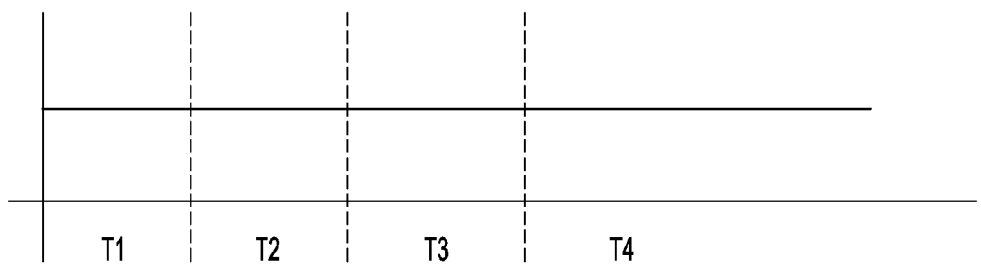
FIG. 13 is yet another exemplary plot of vehicle speed versus time for the vehicle of FIG. 1.

An exemplary rear wheel drive HEV system 10 of FIG. 1 includes an internal combustion engine 12, a crank integrated starter/generator (CISG) 14 and a transmission 16. Other vehicle configurations are also possible. As an example, a front wheel drive HEV system may include an internal combustion engine, a belt integrated starter/generator and a transmission.

The engine 12 includes a crankshaft 18. The CISG 14 is mechanically connected with the crankshaft 18. The system 10 also includes an electronic rear axle drive (ERAD) 20 and a pair of driven wheels 22, 24. The ERAD 20 provides torque to the wheels 22, 24 for electric-only operation and boost. The ERAD 20 also provides for regenerative braking captured from the wheels 22, 24.

The transmission 16 includes a transmission input 25, a torque converter (not shown), a clutch input shaft 26, and an output shaft 28. The clutch input shaft 26 is mechanically coupled with the engine 12 via the torque converter, transmission input 25 and CISG 14. The output shaft 28 is mechanically connected with the ERAD 20. The transmission 16 also includes clutches 30, 32. The clutches 30, 32 are selectively engaged to alter a gear state of the transmission 16. As an example, the clutches 30, 32 may be disengaged to put the transmission 16 into a neutral gear. As another example, the clutches 30, 32 may be engaged, together or separately, to put the transmission 16 into a desired gear. In other examples, the transmission 16 may include a single clutch or more than two clutches.

One or more controllers 34, e.g., a vehicle system controller, communicate with and control the operation of engine 12, CISG 14, transmission 16 and ERAD 20. As an example, the controller 34 may issue actuation commands to clutches 30, 32 of transmission 16. As another example, controller 34 may issue commands to ramp down ERAD torque and ramp up engine torque. As yet another example, the controller 34 may determine a target speed for the crankshaft 18 based on vehicle speed, a desired gear of the transmission 16 and an offset to achieve a smooth power source transition from the ERAD 20 to the engine 12.

Rolling Start Power on Launch

The ERAD 20 may provide for electric drive. The transmission 16 is placed in neutral to avoid associated spin and pump losses during electric drive. If a driver presses an accelerator pedal (not shown), a rolling pull-up and start will occur if the engine 12 is required to meet driver demand. This requires the transmission 16 to transition from neutral to a desired gear. The vehicle should remain accelerating at approximately the same rate to ensure a smooth transition out of electric drive. A target speed of the transmission input 25, and thus the clutch input shaft 26, is positively offset from a synchronous speed to achieve this smooth transition.

A strategy to start the engine 12 and then transfer wheel torque from the ERAD 20 to the engine 12 is described with reference to FIGS. 2-5. The rolling start power on launch event has been divided into four time intervals $T_1$, $T_2$, $T_3$ and $T_4$. During $T_1$, the vehicle is slightly accelerating due to driver demand. The transmission 16 is in neutral resulting in a speed of the clutch input shaft 26 of approximately zero. Pressure associated with a hydraulic line (not shown) servicing the transmission 16 and clutches 30, 32 is low. Torque from the ERAD 20 is high while torque from the CISG 14, engine 12 and output shaft 28 is low as the vehicle is being driven electrically by the ERAD 20.

During $T_2$, the driver demand exceeds the power threshold of the ERAD 20 and/or a battery (not shown). The CISG 14 is commanded to start the engine 12 using speed control. The CISG 14 produces enough torque to overcome the static friction forces, inertial forces, thermal losses and pumping losses of the engine 12. Torque from the engine 12 drops due to these forces and losses as the crankshaft 18 is spinning but not transmitting any positive torque. The speed of the clutch input shaft 26 begins to increase. The CISG 14 speed input to the transmission 16 and/or an auxiliary oil pump (not shown) provides line pressure to begin stroking of the clutch 30 in preparation for gear engagement.

During $T_3$, the engine 12 is placed in torque control and the engine torque is ramped up to the value of the CISG torque at the beginning of $T_3$. While the engine 12 is in torque control, the engine torque ramps up at a rate. As a result, the CISG torque decreases at a similar rate because the CISG 14 is in speed control. Engine start can thus be determined by a drop in CISG torque. Once the engine start is determined, the transmission input 25 remains in speed control and the speed of the transmission input 25, and thus the clutch input shaft 26, is commanded to be the synchronous speed of the transmission 16 plus a positive offset. The synchronous speed is based on accelerator pedal input, vehicle speed and speed ratio of the transmission 16. A smooth acceleration trajectory during the transition from neutral to engaged may be ensured by matching the speed of the transmission input 25 to the synchronous speed in the target gear. The positive offset is used to prevent driveline torque reversal as the clutches 30, 32 engage. The amount of the offset may vary depending on design considerations.

During $T_4$, the clutches 30, 32 are locked and the shift from neutral to engaged is complete. The actuation of clutches 30, 32 is determined from a shift schedule for the gear commanded. The engine torque can be increased because the transmission 16 is fully engaged. The engine torque increases at approximately the same rate as the ERAD torque decreases to ensure constant torque at the wheels 22, 24.

Rolling Pull-Up Power Off

The engine 12 may be shut off and regenerative braking used to capture energy under coasting conditions. If the battery (not shown) has a high state of charge, a rolling pull-up will occur to prevent the battery from overcharging. This requires the transmission 16 to transition from neutral to a desired gear. The vehicle should keep decelerating at approximately the same rate to ensure a smooth transition into a rolling pull-up. A target speed of the transmission input 25, and thus the clutch input shaft 26, is negatively offset from a synchronous speed to achieve this smooth transition.

A strategy to pull-up the engine 12 during regenerative braking is described with reference to FIGS. 6-9. The rolling pull-up power off event has been divided into four time intervals $T_1$, $T_2$, $T_3$ and $T_4$. During $T_1$, the vehicle is coasting down and the ERAD 20 is in regenerative mode. As a result, the ERAD torque is negative.

During $T_2$, the CISG 14 is commanded to pull-up the engine 12 using speed control. The CISG 14 produces enough torque to overcome the static friction forces, inertial forces, thermal losses and pumping losses of the engine 12. Torque from the engine 12 drops due to these forces and losses as the crankshaft 18 is spinning but not transmitting any positive torque. The speed of the clutch input shaft 26 begins to increase. The CISG 14 speed input to the transmission 16 and/or an auxiliary oil pump (not shown) provides line pressure to begin stroking of the clutch 30 in preparation for gear engagement.

During $T_3$, a smooth deceleration trajectory during the transition from neutral to engaged may be ensured by matching the speed of the transmission input 25, and thus the clutch input shaft 26, to the synchronous speed in the target gear. The negative offset is used to overcome the inertial effects of the engagements of clutches 30, 32. The CISG torque decreases because of the change in speed command to the CISG 14 from increasing to decreasing.

During $T_4$, the clutches 30, 32 are locked and the shift from neutral to engaged is complete. The actuation of clutches 30, 32 is determined from a shift schedule for the gear commanded. The CISG 14 is switched to torque control after clutch 32 engages and the CISG torque is held at approximately zero as the ERAD torque is ramped up to zero, i.e., as the ERAD 20 exits regenerative mode.

Rolling Start Road Load

The ERAD 20 may provide for electric drive at road load. The transmission 16 is placed in neutral to avoid associated spin and pump losses during electric drive. If a driver lightly and constantly presses the accelerator pedal (not shown), a rolling pull-up and start will occur if the engine 12 is required to meet driver demand. This requires the transmission 16 to transition from neutral to a desired gear. If the vehicle is at a constant velocity before the start, the vehicle should remain at a constant velocity while the power source changes from the ERAD 20 to the engine 12 to ensure a smooth transition out of electric drive. The speed of the transmission input 25, and thus the clutch input shaft 26, is positively offset from a synchronous speed to achieve this smooth transition. After the transition, if the pedal input remains constant, the engine torque will be controlled to maintain the same torque to the wheels 22, 24 as in electric drive.

A strategy to pull-up and start the engine 12 and then transfer the source of wheel torque from the ERAD 20 to the engine 12 is described with reference to FIGS. 10-13. The rolling start road load event has been divided into four time intervals $T_1$, $T_2$, $T_3$ and $T_4$. During $T_1$, the vehicle is moving under constant pedal input and the ERAD 20 is providing torque to the wheels 22, 24.

During $T_2$, the engine 12 is commanded to start due to, for example, a low state of charge of the battery (not shown) or other power requests. The CISG 14 is commanded to start the engine using speed control. The CISG 14 produces enough torque to overcome the static friction forces, inertial forces, thermal losses and pumping losses of the engine 12. Torque from the engine 12 drops due to these forces and losses as the crankshaft 18 is spinning but not transmitting any positive torque. The speed of the clutch input shaft 26 begins to increase. The CISG 14 speed input to the transmission 16 and/or an auxiliary oil pump (not shown) provides line pressure to begin stroking of the clutch 30 in preparation for gear engagement.

During $T_3$, the engine 12 is placed in torque control and the engine torque is ramped up to the value of the CISG torque at the beginning of $T_3$. The engine start can be determined by a drop in the CISG torque while the CISG 14 is in speed control. Once the engine start is determined, the transmission input 25 remains in speed control and the speed of the transmission input 25, and thus the clutch input shaft 26, is commanded to be the synchronous speed of the transmission 16 plus a positive offset. The synchronous speed is based on accelerator pedal input, vehicle speed and speed ratio of the transmission 16. A smooth acceleration trajectory during the transition from neutral to engaged may be ensured by matching the speed of the input shaft 26 to the synchronous speed in the target gear. The positive offset is used to prevent driveline torque reversal as the clutches 30, 32 engage.

During $T_4$, the engine torque is ramped up to offset the negative charge torque produced by the CISG 14. The engine torque and charge torque are coordinated so that the output torque from the transmission 16 remains constant.

Engine Pull-Up Strategies

As may be seen in FIG. 14, at block 50, a request to pull up an engine is received. This request may be issued by a powertrain control module and based on factors such as a battery state of charge and driver demands for power. At block 52, a set point for a crankshaft speed is established. The set point is based on factors such as vehicle speed, desired gear and an offset. If the vehicle transmission output torque is positive, the offset is positive. If the vehicle transmission output torque is negative, the offset is negative. At block 54, a clutch of a transmission is applied to prepare the transmission to carry torque. At block 56, the engine speed is controlled to achieve the set point. At block 58, another clutch of the transmission is applied to further prepare the transmission to carry torque. At block 60, a transition out of electric drive is executed.

As may be seen in FIG. 15, at block 62, a CISG is set in torque control. At block 64, a transition from ERAD torque to engine torque is coordinated to maintain a constant wheel torque.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for using mechanical power to operate a hybrid electric vehicle including a wheel and an internal combustion engine having a crankshaft, the system comprising:
    an electric machine being configured to spin the crankshaft at a target crankshaft speed to create one of a source and sink of mechanical power;
    a transmission being configured to selectively establish a mechanical path between the crankshaft and the wheel and to pass mechanical power between the crankshaft and the wheel via the mechanical path;
    another electric machine being configured to generate electrical power to operate the vehicle; and
    at least one controller being configured to establish the target crankshaft speed, to use the electrical power to operate the vehicle and to use the mechanical power to operate the vehicle.

2. The system of claim 1 wherein the transmission selectively establishes the mechanical path between the crankshaft and the wheel by selectively shifting from a neutral state to an engaged state.

3. The system of claim 2 wherein the transmission includes a clutch and wherein selectively shifting the transmission from the neutral state to the engaged state includes actuating the clutch.

4. The system of claim 1 wherein the mechanical power is passed from the crankshaft to the wheel.

5. The system of claim 1 wherein the mechanical power is passed from the wheel to the crankshaft.

6. The system of claim 1 wherein the at least one controller is further configured to ramp down the electrical power used to operate the vehicle.

7. The system of claim 1 wherein the at least one controller is further configured to ramp down the electrical power used to operate the vehicle at a first rate and ramp up the mechanical power used to operate the vehicle at a second rate and wherein the first rate is approximately equal to the second rate.

8. The system of claim 1 wherein the target crankshaft speed is based on vehicle speed, a desired gear for the transmission and an offset factor.

9. The system of claim 8 wherein the offset factor is based on whether the mechanical power is being passed from the crankshaft to the wheel or from the wheel to the crankshaft.

* * * * *